US012736854B2

(12) United States Patent
Chang

(10) Patent No.: US 12,736,854 B2
(45) Date of Patent: Sep. 15, 2026

(54) SHIELDING STRUCTURE AND ELECTRONIC DEVICE HAVING THE SAME

(71) Applicant: Tymphany HK Limited, Hong Kong (HK)

(72) Inventor: Yao-Wen Chang, Taipei City (TW)

(73) Assignee: TYMPHANY HK LIMITED, Hong Kong (HK)

( * ) Notice: Subject to any disclaimer, the term of this patent is extended or adjusted under 35 U.S.C. 154(b) by 520 days.

(21) Appl. No.: 18/499,463

(22) Filed: Nov. 1, 2023

(65) Prior Publication Data

US 2024/0142629 A1 May 2, 2024

Related U.S. Application Data

(60) Provisional application No. 63/421,293, filed on Nov. 1, 2022.

(51) Int. Cl.

| | |
|---|---|
| ***G03B 11/04*** | (2021.01) |
| ***G01S 7/481*** | (2006.01) |
| ***G01S 17/894*** | (2020.01) |
| ***G03B 9/52*** | (2021.01) |
| ***G03B 17/12*** | (2021.01) |

(52) U.S. Cl.
CPC .......... *G03B 11/043* (2013.01); *G01S 7/4813* (2013.01); *G01S 17/894* (2020.01); *G03B 9/52* (2013.01); *G03B 17/12* (2013.01)

(58) Field of Classification Search
CPC .................................................... G03B 11/043
See application file for complete search history.

(56) References Cited

U.S. PATENT DOCUMENTS

| | | | | |
|---|---|---|---|---|
| 10,732,486 | B2 * | 8/2020 | Kinoshita | G06F 1/1686 |
| 12,066,742 | B2 * | 8/2024 | Mori | G03B 11/04 |

* cited by examiner

*Primary Examiner* — Leon W Rhodes, Jr.
(74) *Attorney, Agent, or Firm* — MUNCY, GEISSLER, OLDS & LOWE, P.C.

(57) ABSTRACT

A shielding structure may be applied on an electronic device. The electronic device includes a camera and a TOF sensor having a transmitter and a receiver. The shielding structure includes a base, a shutter movably connected with the base, and a barrier movably connected with the base. At least a part of the barrier is disposed between the transmitter and the receiver, and the barrier may block a signal transmitted by the transmitter. An elastic member is fixed on the base. When the shutter is moved to abut the barrier, the barrier is pushed to press the elastic member, wherein the elastic member is deformed allowing at least a portion of the shutter disposing and abutting on the barrier, and the camera and the TOF sensor may be covered by the shutter at the same time.

19 Claims, 6 Drawing Sheets

SHIELDING STRUCTURE AND ELECTRONIC DEVICE HAVING THE SAME

CROSS-REFERENCE TO RELATED APPLICATIONS

This application claims priority of U.S. Provisional Application No. 63/421,293 filed on Nov. 1, 2022 under 35 U.S.C. § 119(e), the entire contents of which are hereby incorporated by reference.

BACKGROUND

Technical Field

The disclosure is related to the technical field of time of flight (TOF) sensors, and in particular to a shielding structure and electronic device having the shielding structure.

Related Art

In order to protect users' personal privacy, most electronic devices with cameras today include shielding components. When the camera is not in use, the camera can be covered with a shield. In order to increase certain functions, such as automatic focusing, of the camera, the TOF sensor next to the camera may be used. The TOF sensor can calculate the distance between the measured object and the TOF sensor by measuring the "time of flight" of ultrasonic, microwave or light signals between the emitter and reflector.

The glass edge area of the display screen of electronic device usually has corresponding transparent areas for the camera and TOF sensor respectively, for taking pictures and sending and receiving TOF sensing signals. The shield cover of the electronic device can only cover the camera, and the TOF sensor will be exposed on the display screen.

SUMMARY

All examples and features mentioned below can be combined in any technically possible way.

In one aspect, a shielding structure is provided, which may be applied on an electronic device. The electronic device includes a camera and a TOF sensor having a transmitter and a receiver. The shielding structure includes a base, a shutter movably connected with the base, and a barrier movably connected with the base. At least a part of the barrier is disposed between the transmitter and the receiver, and the barrier may block the signal transmitted by the transmitter. An elastic member is fixed on the base, when the shutter is moved to abut the barrier, the barrier is pushed to press the elastic member, wherein the elastic member is deformed allowing at least a portion of the shutter disposing and abutting on the barrier, and the camera and the TOF sensor may be covered by the shutter at the same time.

Implementations may include one of the following features, or any combination thereof.

In some implementations, the base includes a groove, the shutter includes a first hook, and the first hook is moveably connected and hooked to the groove.

In certain implementations, the shutter includes more than one first hook.

In some implementations, the barrier includes a guiding slant, and when the shutter is moved to the guiding slant, the barrier is driven to press the elastic member.

In certain implementations, the guiding slant is an inclined plane.

In some implementations, the transmitter is located between the receiver and the guiding slant.

In certain implementations, the transmitter is sleeved within the barrier.

In some implementations, the barrier includes a hollow part, and at least a portion of the transmitter is disposed in the hollow part.

In some implementations, the shutter is moved towards a first direction, the barrier is driven to press the elastic member towards a second direction, and the first direction is different from the second direction.

In some implementations, the barrier includes a second hook contacting to the elastic member, the base includes a through hole, and the second hook is moveably connected and hooked to the through hole.

In some implementations, the elastic member includes a support contacting and connecting with the second hook.

In some implementations, the top of the barrier includes a ring part formed with an arc chamfering, when the shutter is moved to the ring part of the barrier, the barrier is driven to press the elastic member.

In certain implementations, the shielding structure further includes a first connecting part and an operating component moveably connected with each other, wherein the first connecting part is connected with the base, and the first connecting part is moveably connected to the shutter.

In some implementations, the operating component includes a second connecting part and a control portion fixed on the second connecting part, and the first connecting part is moveable connected with the second connecting part.

In some implementations, the first connecting part includes a third hook, the second connecting part includes a second sliding hole, and the third hook is moveable connected and hooked to the second sliding hole.

In some implementations, the shutter includes a fourth hook, the first connecting part includes a second sliding hole, and the fourth hook is moveable connected and hooked to the second sliding hole.

In another aspect, an electronic device is provided. The electronic device includes a shielding structure as described above and a glass. The glass is disposed on the base. When the shutter is moved away from the barrier, the barrier is contacted with the glass.

In some implementations, the electronic device includes a sensor for sensing the shutter. When the shutter is moved to cover the camera and the TOF sensor, the sensor is triggered to power off the camera and the TOF sensor.

In some implementations, the shutter includes a control portion exposed out of the base and the glass. The control portion may be moved to drive the shutter sliding towards the barrier for covering the camera and the TOF sensor.

BRIEF DESCRIPTION OF THE DRAWINGS

The present disclosure will become more fully understood from the detailed description given herein below for illustration only, and thus not limitative of the present invention, wherein.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection.

It should be noted that the terms "first", "second", etc. in the description and claims of this disclosure and the above-mentioned drawings are used to distinguish similar elements and are not necessarily used to describe a specific order or sequence. In the following description, numerous specific details are given to provide a thorough understanding of the invention. However, it will be apparent that the invention may be practiced without these specific details. In order to avoid obscuring the present invention, some well-known devices, instrument configurations, and process steps are not disclosed in detail.

Also, in the following description, connected and coupled are used to describe a relationship between two members. The term "connected" means that the two members are physically and directly joined to each other. Different members can be connected in variety of ways. For example, different members can be connected by being formed adjacent to each other, such as through molding or carving. Also, for example, different members can be connected by being attached together, such as through adhesives, fasteners, welds, or brazing.

Figure 1:
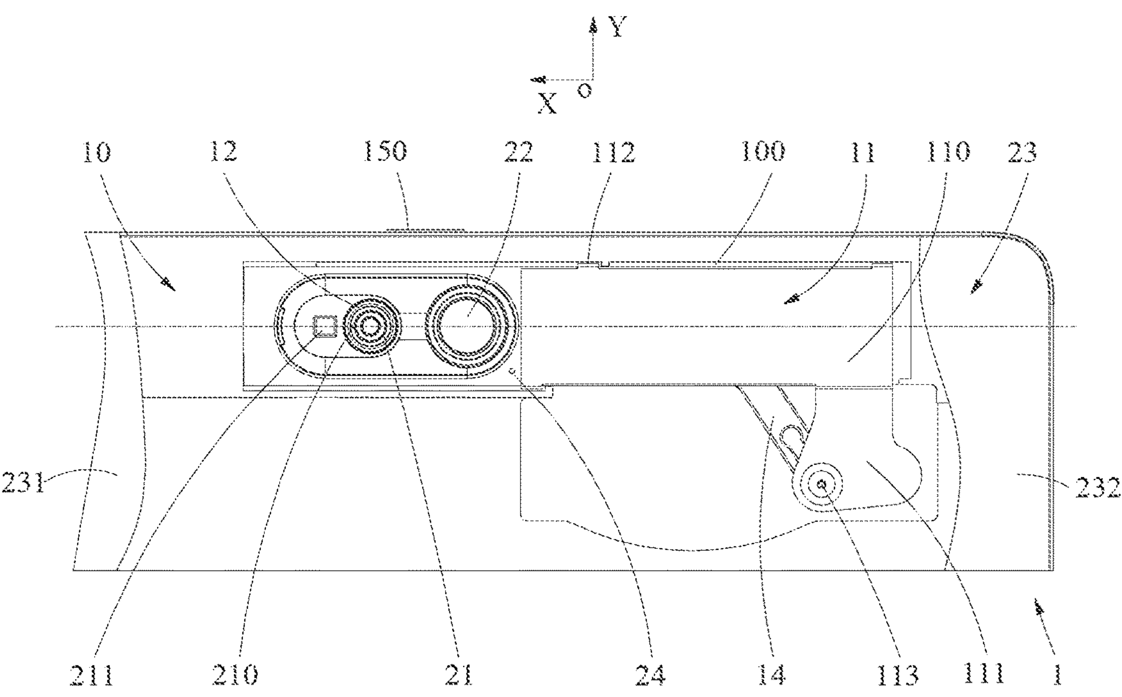
FIG. 1 is a partial perspective view of the shielding structure in accordance with the present disclosure.
Figure 2:
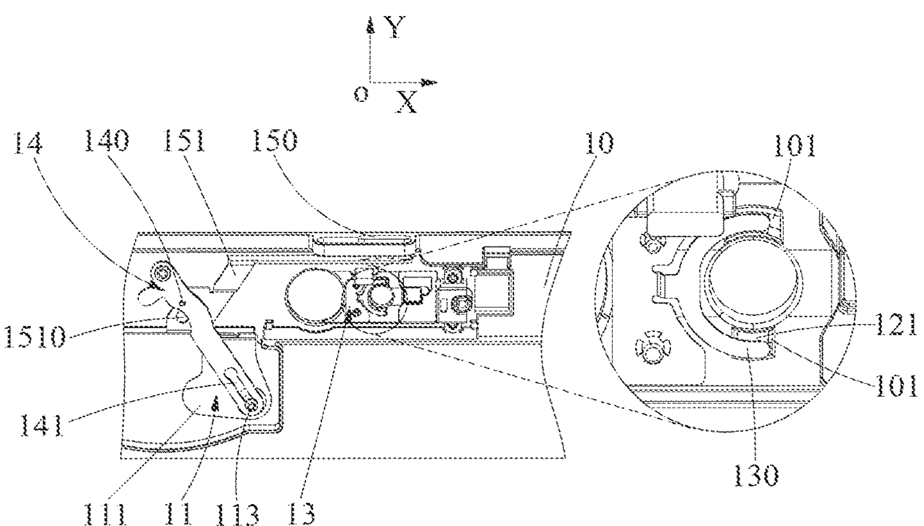
FIG. 2 is another partial perspective view of the shielding structure and its partial enlarged view in the first embodiment of the present disclosure.
Figure 7:
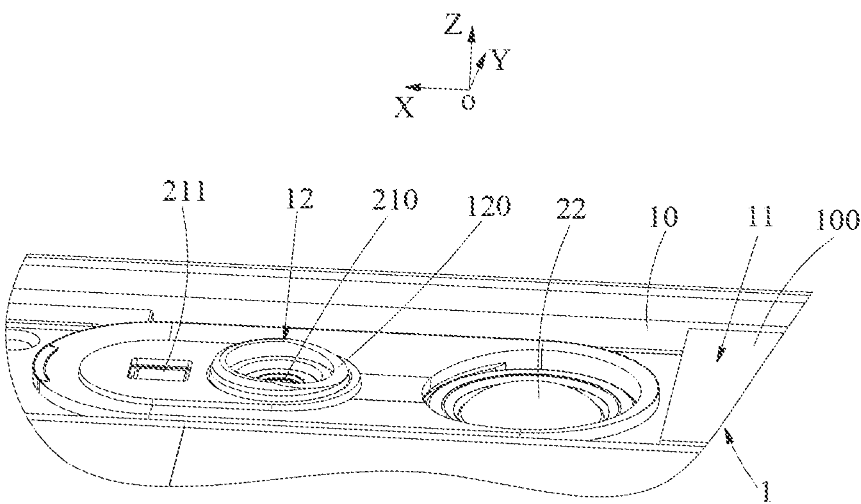
FIG. 7 is another perspective view of the shielding structure in accordance with the present disclosure.

FIGS. 1, 2 and 7 illustrate a first embodiment. In this embodiment, a shielding structure 1 is provided, which may be applied to an electronic device including a camera 22 and a TOF sensor 21 (shown in FIG. 3). The TOF sensor 21 includes a transmitter 210 and a receiver 211. The shielding structure 1 includes a base 10, a shutter 11, a barrier 12 and an elastic member 13. The shutter 11 and the base 10 are movably connected to each other. The barrier 12 and the base 10 are also movably connected to each other. The barrier 12 may cover at least a part of the signal emitted by the transmitter 210. At least a portion of the barrier 12 is disposed between the transmitter 210 and the receiver 211. The elastic member 13 is fixed to the base 10. When the shutter 11 abuts the barrier 12, the barrier 12 is pushed to move. The barrier 12 drives the elastic member 13 to move, so as to form a space S (as shown in FIG. 4). The shutter 11 may pass through the space S, so as to cover both the camera 22 and the TOF sensor 21.

Referring to FIGS. 1, 2 and 7, in order to prevent the signal emitted by the transmitter 210 of the TOF sensor 21 from being blocked and reflected by the glass 23 and then directly received by the receiver 211, causing the TOF sensor 21 to be unable to measure the distance correctly. The transmitter 210 may be sleeved within the barrier 12, and the side walls around the barrier 12 may prevent the signal emitted by the transmitter 210 from being directly received by the receiver 211 without being reflected by the object to be measured. The barrier 12 has a hollow part, and at least a part of the transmitter 210 is set in the hollow part. For example, the barrier 12 may be a flat columnar structure with a hollow area, and the transmitter 210 is located in the hollow area of the barrier 12.

The elastic member 13 is connected to the barrier 12 for elastically supporting the barrier 12. When the shutter 11 abuts the top arc chamfering or cut surface of the barrier 12, such as abutting on a guiding slant 120, the barrier 12 pushes the elastic member 13. Thus, the elastic member 13 is pressed downward by the barrier 12, a space S (shown in FIG. 4) is then formed. When the shutter 11 passes through the space S, the camera 22 and the TOF sensor 21 both may be covered at the same time.

For convenience of explanation, an O-xyz coordinate is shown in each figure. The length direction of the base 10 is arranged along the X-axis, and the width direction of the base 10 is arranged along the Y-axis. The Z axis is perpendicular to the base 10. The positive directions of the X, Y, and Z axes face the same direction in each figure. The positive direction of the Z-axis is the front of the figures, and the negative direction of the Z-axis is the back.

Referring to FIGS. 1 and 2, the TOF sensor 21 (shown in FIG. 3) and the camera 22 may be fixed on the base 10. The base 10 may be a base plate or a back plate in an electronic device, which is used to fix related components. A glass 23 may be provided on the front side of the base 10. The glass 23 includes a display area 231 and an ink area 232. The ink area 232 includes a first light-transmitting area and a second light-transmitting area for exposing the camera 22 and the TOF sensor 21, respectively. Thus, the camera 22 may take pictures and the TOF sensor 21 may transmit and receive signals. The TOF sensor 21 may be a laser or near-infrared TOF sensor. The TOF sensor 21 includes a transmitter 210 and a receiver 211. The barrier 12 is set with the transmitter 210. The transmitter 210 may transmit a signal in a direction parallel to the Z-axis, for example, the transmitter 210 may transmit an optical signal. The base 10 may be in the shape of a rectangular plate, and its material may be plastic. The device may be an electronic device 2 in the second embodiment (shown in FIG. 3).

The shutter 11 and the barrier 12 may be made of opaque materials. For example, the shutter 11 and the barrier 12 can be made of plastic materials such as black PC+ABS, PC, ABS or POM, etc. The shutter 11 includes a rectangular portion 110 and a nose portion 111. The lower end of the rectangular portion 110 and the upper end of the nose portion 111 may be integrally formed or rotationally connected. The rectangular portion 110 of the shutter 11 may be in the shape of a rectangular plate, and the area of the rectangular portion 110 of the shutter 11 is greater than the sum of the surfaces of the TOF sensor 21 and the camera 22.

The middle portion in the width direction of the rectangular portion 110 of the shutter 11 may pass through the central axes of the transmitter 210, the receiver 211, and camera 22. The middle plane is the plane parallel to the XOZ plane, which is passing through the midpoint of the width of the rectangular portion 110 of the shutter 11. The transmitter 210 may be located in the hollow part of the barrier 12, and the receiver 211 may be located on the outer side of the barrier 12 and spaced apart from the barrier 12. That is, the barrier 12 is provided between the transmitter 210 and the receiver 211.

The movable connection between the shutter 11 and the base 10 may be a sliding connection by using a sliding guide track or other means, which will be described more detailed in below. For example, the shutter 11 and the base 10 are moveably connected by using a first hook 112 and a groove 100. The sliding direction of the shutter 11, with respect to the base 10, may define as a first direction. The first direction may be a direction parallel to the X-axis. For example, the shutter 11 may slide along a direction parallel to the X-axis, which may be from left to right (or from right to left) respect to the base 10. The shutter 11 may contact to the top of the barrier 12 along the X-axis. The top of the barrier 12 may be in the shape of a ring (as shown in FIG. 4). Below will describe more about the barrier 12 and the base 10. The barrier 12 may be moved forward and backward with respect to the base 10 in a direction parallel to the Z-axis through the elastic member 13.

For example, the moving direction of the shutter 11 is the first direction, and the barrier 12 abuts and presses the elastic member 13 along the second direction. The first direction and the second direction may be in different directions. For example, the first direction may be perpendicular to the second direction. The shutter 12 may be moved to push the elastic member 13 moving along the second direction, which may avoid the glass 23 being damaged because the second direction is substantially perpendicular to the glass 23. The first direction may be a direction parallel to the X-axis. The second direction may be a direction parallel to the Z-axis. The elastic member 13 is against the bottom of the barrier 12. When the shutter 11 is moved, such as from right to left, to cover the camera and the TOF sensor 21 and the camera 22, the barrier 12 is pressed downwardly by the moving of the shutter 11. When the shutter 11 is moved, such as from left to right, to uncover the camera and the TOF sensor 21 and the camera 22, the shutter 11 is away from the barrier 12. The barrier 12 is pushed upwardly by the elastic force of the elastic member 13, thus the top of the barrier 12 may contact to the glass 23 as shown in FIG. 4. The transmitting direction of the transmitter 210 is sealed between the barrier 12 and the glass 23, so that the light from the transmitter 210 is not easily scattered to the receiver 211.

Referring to FIGS. 2 and 4, the elastic member 13 may be elastically deformed by the pressing of the barrier 12. The elastic member 13 is elastically deformed to form a space S between the barrier 12 and the glass 23. The space S is used to accommodate at least a part of the shutter 11. The height of the space S may be measured from the bottom of the glass 23 to the bottom of the shutter 11 (after the elastic member 13 is elastically deformed). Therefore, if the glass 23 may have different shape, the height of the space S may greater than or substantially equal to the thickness of the shutter 11.

Figure 12:
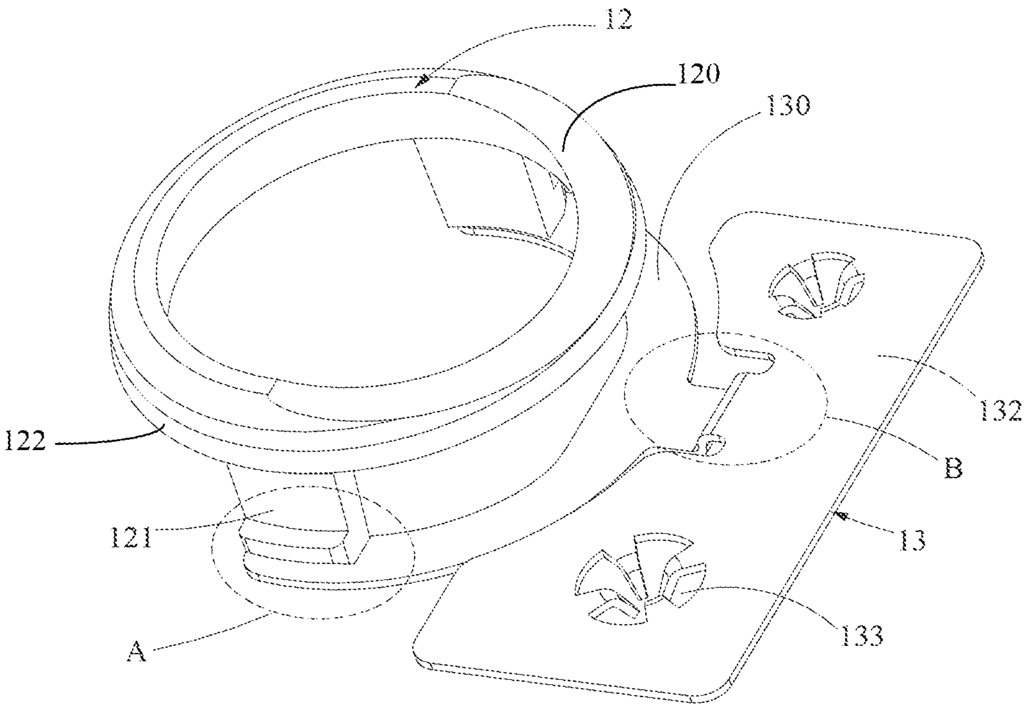
FIG. 12 is a perspective view of the elastic member and the barrier in the first embodiment of the present disclosure.

As shown in FIGS. 2 and 12, the elastic member 13 may be a spring or an elastic sheet. The elastic member 13 may be fixed on the rear side of the base 10. The elastic member 13 may be fixed to the base 10 by snapping, screwing, riveting or gluing. The right end of the elastic member 13 may be fixed to the base 10, and the left end of the elastic member 13 may abut with the barrier 12.

Figure 4:
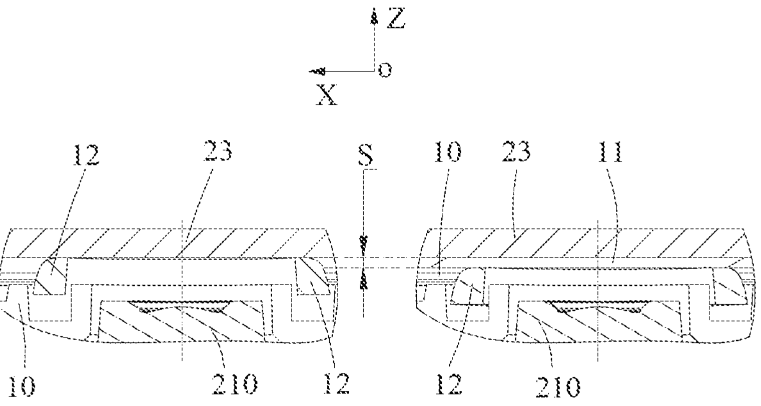
FIG. 4 is a partial cross-sectional view showing the state changes of the barrier moving before and after in the first embodiment in accordance with the present disclosure.
Figure 5:
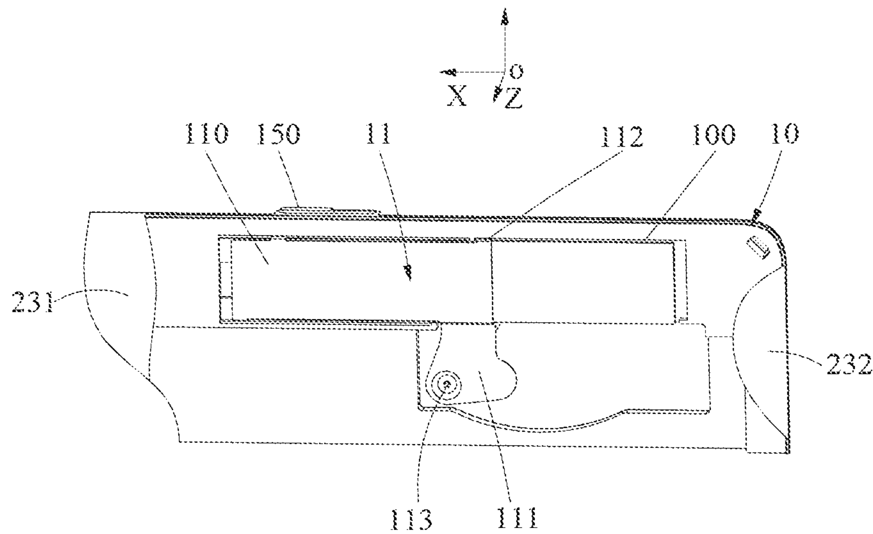
FIG. 5 is a perspective view of the shielding structure in accordance with the present disclosure.

As shown in FIG. 4, the left side shows that the barrier 12 remains in the original position, which is before the shutter 11 moving to abut on the barrier 12. The right side shows the shutter 11 is moved to a position on the barrier 12, and the barrier 12 is pushed downwardly to press the elastic member 13. Accordingly, the space S may be formed by the deformation of the elastic member 13, and the height of the space S is along the Z-axis direction. When the shutter 11 is moved to a position on the barrier 12, the emission surface of the transmitter 210 may by covered by the shutter 11. Furthermore, as shown in FIG. 5, the shutter 11 may cover the TOF sensor 21 and the camera 22 at the same time.

When the TOF sensor 21 is needed for work, such as sensing an object for measuring distance, the shutter 11 may be moved from left to right. As long as the shutter 11 is moved away from the barrier 12, the barrier 12 may be bounced up along Z-axis by the elastic force from the elastic member 13. Then, the barrier 12 is contacted with the glass 23 for blocking (light) signals transmitted by the transmitter 210, and the TOF sensor 21 and the camera 22 may be uncovered by the shutter 11 with normally function.

As shown in FIGS. 1 and 4, the barrier 12 directly contacts the glass 23 (in the ink area), so there would be no signal emitted from the transmitter 210 passing through the barrier 12 to the receiver 211. The signal from the transmitter 210 may be emitted substantially in the direction of Z-axis, which may reach the object to be detected and then reflected to the receiver 211 for normal detection function.

Figure 6:
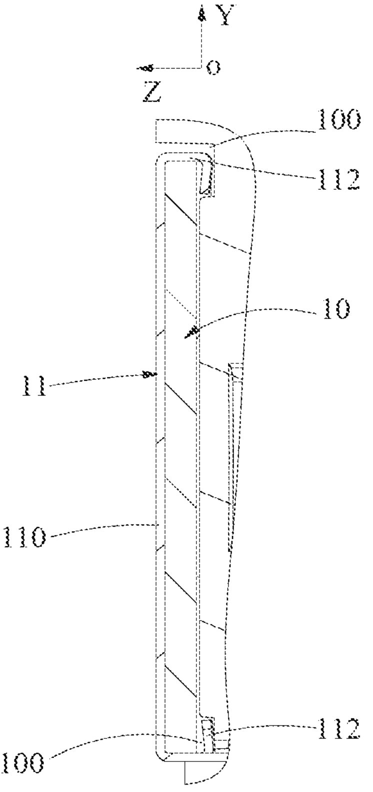
FIG. 6 is a partial cross-sectional view of the shutter and the base in accordance with the disclosure.

Preferably, the base 10 may include a groove 100, and the shutter 11 includes a first hook 112, as shown in FIGS. 1 and 6. The groove 100 and the first hook 112 are moveably connected, wherein the first hook 112 is hooked in the groove 100. The groove 100 is arranged along the X-axis, and the first hook 112 may be moved along the X-axis in the groove 100. Preferably, the number of the grooves 100 may be arranged with two (2) in parallel. The transmitter 210, the receiver 211, the barrier 12, and the camera 22 may be disposed between the two groves 100. The cross-sectional view of the groove 100 and the first hook 112 may be in the shape of "L" and "U" respectively. One side of the first hook 112 may integrally connect with the rectangular portion 110 of the shutter 11, and the other side of the first hook 112 may be engaged within the groove 100. The U-shaped first hook 112 may be moved slidingly along the groove 100.

As shown in FIGS. 2 and 6, the first hook 112 is hooked in the groove 100, which may avoid the first hook 112 decoupling from the groove 100. For example, when the shutter 11 is disposed on and abutting against the barrier 12, the deformed elastic member 13 may provide a reaction force in the direction of Z-axis. Because the first hook 112 is hooked within the grove 100, the shutter 11 may be kept on the base 10.

The number of the first hook 112 may be more than one (1), such as four (4). The four first hooks 112 may be arranged in the direction along the X-axis. Two first hooks 112 may be disposed in the upper side edge of the rectangular portion 110 of the shutter 11, and the other two first hooks 112 may be disposed in the lower side edge of the rectangular portion 110. The more first hooks 112 that are arranged, the more strengthened is the connection with the groove 100. The shutter 11 may be more strongly fixed on the base 10.

Figure 8:
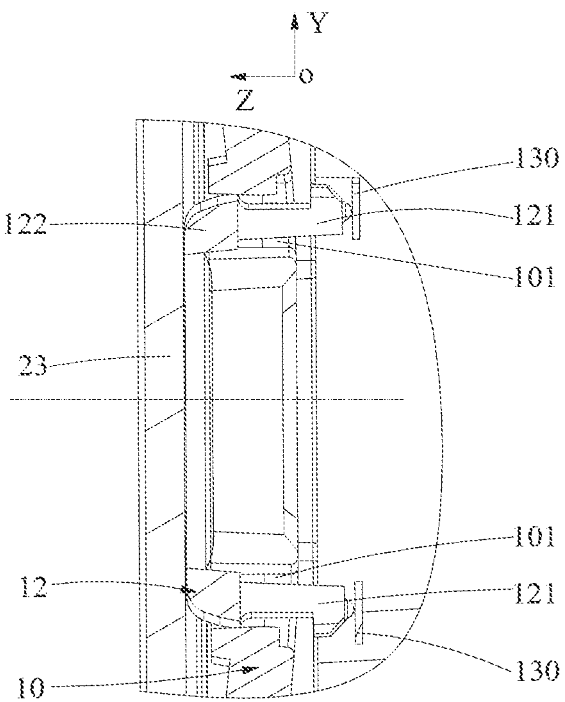
FIG. 8 is a partial cross-sectional view of the shielding structure in accordance with the present disclosure.

Preferably, as shown in FIGS. 7, 8 and 12, the barrier may include a guiding slant 120. When the shutter 11 is moved towards to the barrier 12, the guiding slant 120 may allow the shutter 11 to move continuously and smoothly. As such, the barrier 12 may be pushed by the shutter 11 downwardly (i.e., Z direction), and a support 130 of the elastic member 13 may be pressed downwardly. When the shutter 11 pushes against the guiding slant 120 along the moving direction (i.e., X direction), the guiding slant 120 may generate a force downwardly (i.e., Z direction) so as to push the barrier 12 downwardly. The guiding slant 120 may be used to guide the shutter 11 moving, to generate force downwardly, and to avoid being hit by the shutter 11. The guiding slant 120 may be an arc (as shown in FIG. 4 or 8) or a slope that gradually decreases from the positive direction of the X-axis to the negative direction of the X-axis. For example, the guiding slant 120 is inclined. The angle between the guiding slant 120 and the XOY plane may be an acute angle. The guiding slant 120 may be disposed symmetrically about a middle plane in the width direction of the rectangular portion 110 of the shutter 11.

As shown in FIG. 7, preferably, the receiver 211 is located at one side of the transmitter 210. The guiding slant 120 is located on the barrier 12 at the side away from the receiver 211. For example, the receiver 211 may be located at the right side of the barrier 12 and spaced away from the barrier 12. The inclined guiding slant 120 is located at the side away from the receiver 211, which may form a notch between the guiding slant 120 and the glass 23 (shown in FIG. 1). The location of the guiding slant 120 on the barrier 12 may guide the shutter 11 and maintain the barrier 12 blocking signals from the transmitter 210. The function of the TOF sensor 21 may be ensured.

As shown in FIGS. 1, 8 and 12, preferably, the barrier 12 includes a second hook 121, and the base 10 includes a through hole 101. The second hook 121 is hooked with the through hole 101 and connected slidingly. The second hook 121 contacts the elastic member 13 (shown in FIG. 2). The barrier 12 may include a ring part 122. The outer of the ring part 122 is formed with arc chamfering for engaging with a hollowed portion of the base 10. The shape of the barrier 12 contacting with the shutter 11 or the glass 23 may be different. The second hook 121 and the ring part 122 may be integrally connected. The signal emitted from the transmitter 210 may be blocked by the ring part 122 of the barrier 12. The cross-sectional view of the second hook 121 may be similar to “L”. The horizontal part of the “L” shaped second hook 121 may contact to the back of the base 10 when the barrier 12 is pushed downwardly in the Z direction. The vertical part of the second hook 121 may be moved within the through hole 101 in Z direction. The horizontal part and the vertical part of the second hook 121 can be integrally formed. The shape of the through hole 101 may be long rectangular.

As shown in FIGS. 8 and 12, the number of the second hook 121 may be two (2), and the through holes 101 are arranged correspondingly. The second hook 121 may be made by an elastic material. When assembled, the horizontal part of the “L” shaped second hook 121 is hooked to the through holes 101.

Figure 9:
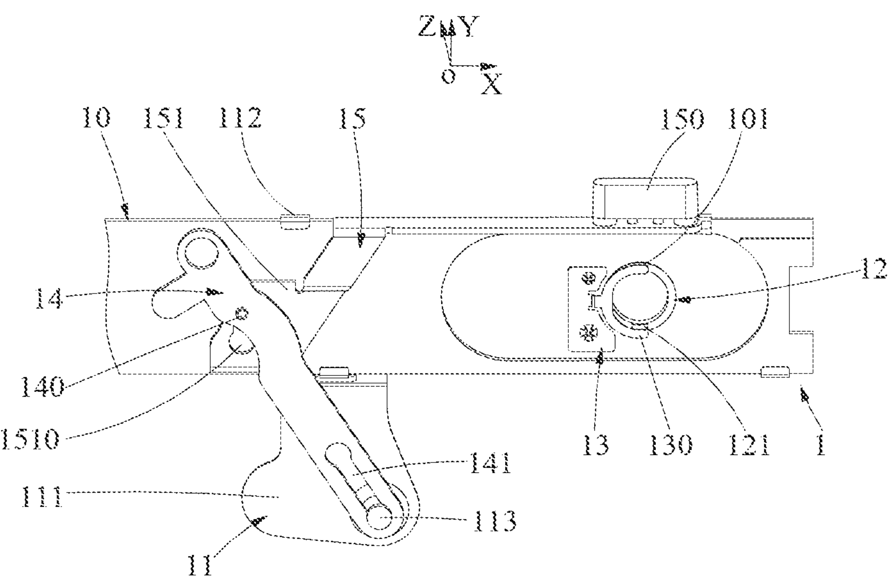
FIG. 9 is a further another perspective view of the shielding structure in accordance with the present disclosure.

As shown in FIGS. 1, 9 and 12, the elastic member 13 includes a support 130. At least two second hook 121 is contacted with the support 130. The support 130 may be an arc sheet. The elastic member 13 is located between the transmitter 210 and the camera 22. The support 130 is near and around the transmitter 210. The support 130 is elastic. When the barrier 12 is pushed, the second hook 121 presses the support 130 of the elastic member 13 in the Z direction. In some other embodiments, the second hook 121 may be connected to the support 130 of the elastic member 13 by any means, such as structural engagement or adhesive boning (as shown in A, FIG. 12). The support 130 may connect to the main body 132 of the elastic member 13 through an L"shaped connection portion (as shown in B, FIG. 12). The connection portion may provide a better elasticity. A screw hole 133 may be provided for the elastic member 13 to be fixed on to a fixture or the base 10.

Preferably, as shown in FIGS. 1 and 9, the shielding structure 1 further includes a first connecting part 14 and an operating component 15. The first connecting part 14 is connected to the base 10. The shutter 11 is slidingly connected with the first connecting part 14, and the first connecting part 14 is slidingly connected with the operating component 15. The first connecting part 14 is slidingly connected to the nose portion 111 of the shutter 11. The operating component 15 includes a control portion 150 and a second connecting part 151. The control portion 150 is fixed to the second connecting part 151. The second connecting part 151 is slidingly connected to the first connecting part 14.

As shown in FIGS. 1 and 9, the control portion 150 is fixed to the shutter 11 and may be a handle exposed outside of the base 10 for users to control the shutter 11 covering the camera 22 and/or the TOF sensor 21 (shown in FIG. 1). The second connecting part 151 may be in the shape of a “7”. The control portion 150 may be fixed to the right side of the second connecting part 151, or integrally formed in one piece. When the control portion 150 is pushed to move in X direction, the shutter 11 moves, which is driven by the control portion 150.

Figure 10:
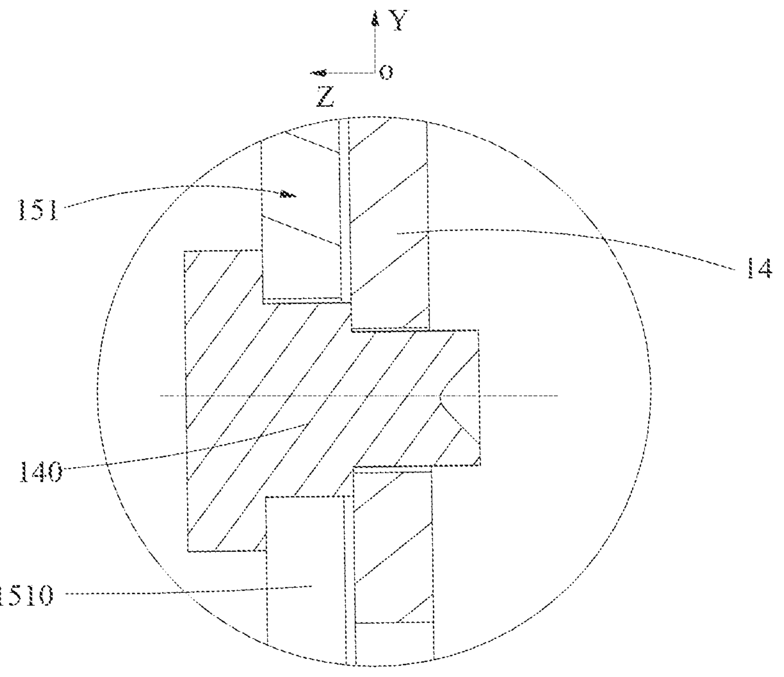
FIG. 10 is a partial cross-sectional view of the first connecting part and the second connecting part in the first embodiment of the present disclosure.

Preferably, as shown in FIG. 10, the first connecting part 14 includes a third hook 140, and the second connecting part 151 includes a first sliding hole 1510. The third hook 140 is slidingly connected with the first sliding hole 1510. The cross-sectional view of the third hook 140 is in the shape of a “T”. The top of the third hook 14 is larger than the diameter of the first sliding hole 1510 in order to hook with the first sliding hole 1510. The third hook 140 is connected to the first connecting part 14 by screwing or riveting, or any other means. The first sliding hole 1510 may be located at the left downside of the second connecting part 151, shaped in long rectangular along Y direction. The third hook 140 may slidingly move along the first sliding hole 1510 (i.e., Y direction). The third hook 140 is hooked with the first sliding hole 1510, thus, during movement, the second connecting part 151 may avoid falling off from the first connecting part 14.

Figure 11:
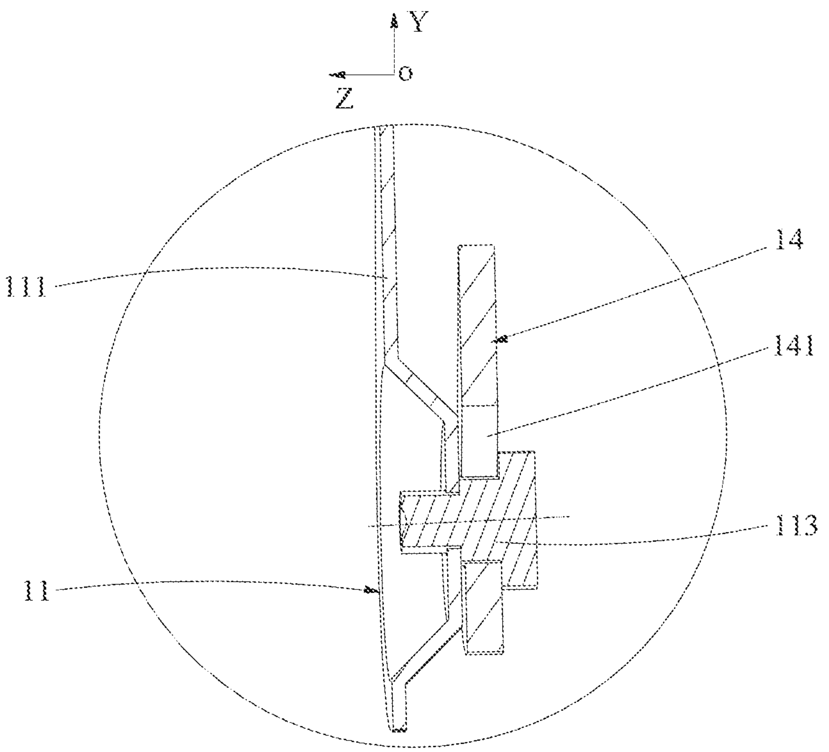
FIG. 11 is a partial cross-sectional view of the first connecting part and the shutter in the first embodiment of the present disclosure.

Preferably, as shown in FIG. 11, the first connecting part 14 includes a second sliding hole 141 located downside thereof, and the shutter 11 includes a fourth hook 113 located downside of the nose portion 111. The fourth hook 113 is slidingly connected to the second sliding hole 141. The top of the fourth hook 113 is hooked with the second sliding hole 141.

As shown in FIG. 11, the cross-sectional view of the fourth hook 113 may be in the shape of a "T". The top of the fourth hook 113 is larger than the diameter of the second sliding hole 141 in order to hook with the second sliding hole 141. The width of the middle part of the T shaped fourth hook 113 is substantially equal to the diameter of the second sliding hole 141. The fourth hook 113 may be connected to the nose portion 111 of the shutter 11 by screwing or riveting, or any means. The fourth hook 113 is hooked with second sliding hole 141 to avoid the first connecting part 14 falling off from the shutter during movement.

Figure 3:
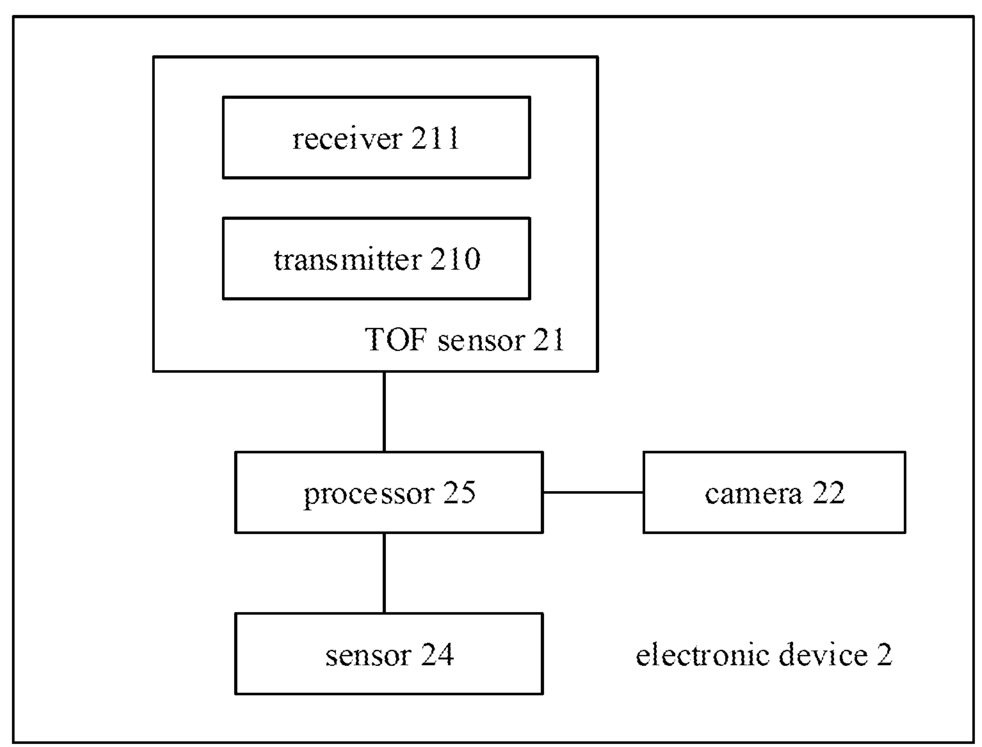
FIG. 3 is a block diagram of an electronic device in accordance with the present disclosure.

Referring to FIGS. 1 and 3, a second embodiment of the present invention includes an electronic device 2 is provided, which includes a glass and the shielding structure 1 in the first embodiment. The glass 23 is disposed on the base 10. The base 10 and the shielding structure 1 both are located at the same side of the glass 23. For example, the shielding structure 1, the camera 22, and the TOF sensor 21 all are located under the glass 23. When the shutter 11 is moved to away from the barrier 12, the barrier 12 contacts the glass 23. The electronic device 2 may be a touch PAD, a touch panel, a smartphone, a notebook, or the like.

Referring to FIGS. 1 and 3, the electronic device 2 may further include a sensor 24 for controlling the camera 22 and the TOF sensor 21. For example, when the shutter 11 covers the camera 22 and the TOF sensor 21 may trigger a signal from the sensor 24 to power off the camera 22 and the TOF sensor 21. The electronic device 2 may include a processor 25 electronically connected with the sensor 24, the TOF sensor 21 and the camera 22 for controlling the power. The sensor 24 may be located at the right side of the camera on the base 10. When the shutter 11 moves towards the left side, the sensor 24 is covered and triggered to control the camera 22 and the TOF sensor 21 power off. The sensor 24 may be a magnetic sensor.

As described above, the shutter 11 may include a control portion 150 exposed out of the base 10 and the glass 23. The user pushes the control portion 150 to drive the shutter 11 moving, and the camera 22 and the TOF sensor 21 may be covered at the same time. The camera 22 and the TOF sensor 21 may be arranged on the same printed circuit board (PCB), and the PCB may be fixed on the base 10.

A number of implementations have been described. Nevertheless, it will be understood that additional modifications may be made without departing from the scope of the inventive concepts described herein. Although this disclosure has been described in considerable detail with reference to certain embodiments thereof, the invention may be variously embodied without departing from the spirit or scope of the invention. Therefore, the following claims should not be limited to the description of the embodiments contained herein in any way.

What is claimed is:

1. A shielding structure for an electronic device, the electronic device comprising a camera and a time of flight (TOF) sensor, the TOF sensor comprising a transmitter and a receiver, and the shielding structure comprising:

a base;

a shutter movably connected with the base;

a barrier movably connected with the base, wherein at least a part of the barrier is disposed between the transmitter and the receiver, and the barrier is configured to block a signal transmitted by the transmitter; and an elastic member fixed on the base, wherein, when the shutter is moved to abut the barrier, the barrier is configured to be pushed to press the elastic member, and wherein the elastic member is configure to be deformed, and the camera and the TOF sensor are configured to be covered by the shutter at a same time.

2. The shielding structure according to claim 1, wherein the base comprises a groove, the shutter comprises a first moveably connected and hooked to the groove.

3. The shielding structure according to claim 2, wherein the shutter comprises more than one first hook.

4. The shielding structure according to claim 1, wherein the barrier comprises a guiding slant, and wherein, when the shutter is moved to the guiding slant, the barrier is configured to be driven to press the elastic member.

5. The shielding structure according to claim 4, wherein the guiding slant is an inclined plane.

6. The shielding structure according to claim 4, wherein the transmitter is located between the receiver and the guiding slant.

7. The shielding structure according to claim 1, wherein the transmitter is sleeved within the barrier.

8. The shielding structure according to claim 1, wherein the barrier comprises a hollow part, and at least a portion of the transmitter is disposed in the hollow part.

9. The shielding structure according to claim 1, wherein, when the shutter is moved towards a first direction, the barrier is configured to be driven to press the elastic member towards a second direction, and wherein the first direction is different from the second direction.

10. The shielding structure according to claim 1, wherein the barrier comprises a second hook contacting to the elastic member, the base comprises a through hole, and the second hook is moveably connected and hooked to the through hole.

11. The shielding structure according to claim 10, wherein the elastic member comprises a support contacting and connecting with the second hook.

12. The shielding structure according to claim 11, wherein a top of the barrier comprises a ring part formed with an arc chamfering, and wherein, when the shutter is moved to the ring part of the barrier, the barrier is configured to be driven to press the elastic member.

13. The shielding structure according to claim 1, further comprising:

a first connecting part; and an operating component moveably connected to the first connecting part, wherein the first connecting part is connected with the base, and the first connecting part is moveably connected to the shutter.

14. The shielding structure according to claim 13, wherein the operating component comprises:

a second connecting part; and a control portion fixed on the second connecting part, wherein the first connecting part is movably connected with the second connecting part.

15. The shielding structure according to claim 14, wherein the first connecting part comprises a third hook, the second connecting part comprises a second sliding hole, and the third hook is movably connected and hooked to the second sliding hole.

16. The shielding structure according to claim 15, wherein the shutter comprises a fourth hook, the first connecting part comprises a second sliding hole, and the fourth hook is movably connected and hooked to the second sliding hole.

17. An electronic device comprising:

a shielding structure according to claim 1; and a glass disposed on the base, wherein, when the shutter is moved away from the barrier, the barrier is configured to be contacted with the glass.

18. The electronic device according to claim 17, further comprising a sensor for sensing the shutter, wherein, when the shutter is moved to cover the camera and the TOF sensor, the sensor is configured to be triggered to power off the camera and the TOF sensor.

19. The electronic device according to claim 17, wherein the shutter comprises a control portion exposed out of the base and the glass, and wherein the control portion is configured to be moved to drive the shutter sliding towards the barrier for covering the camera and the TOF sensor.

* * * * *